United States Patent
Esaki

(10) Patent No.: US 9,710,922 B2
(45) Date of Patent: Jul. 18, 2017

(54) IMAGE PROCESSING APPARATUS, METHOD AND MEDIUM STORING A PROGRAM FOR DETECTING A MOTION VECTOR

(71) Applicant: OLYMPUS CORPORATION, Shibuya-ku, Tokyo (JP)

(72) Inventor: Hisumi Esaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 8 days.

(21) Appl. No.: 14/729,786

(22) Filed: Jun. 3, 2015

(65) Prior Publication Data
US 2016/0035106 A1   Feb. 4, 2016

(30) Foreign Application Priority Data
Jul. 30, 2014  (JP) .................................. 2014-155055

(51) Int. Cl.
| | |
|---|---|
| G06T 7/20 | (2006.01) |
| G06K 9/46 | (2006.01) |
| H04N 19/124 | (2014.01) |
| G06K 9/52 | (2006.01) |
| H04N 19/14 | (2014.01) |
| H04N 19/182 | (2014.01) |
| H04N 19/105 | (2014.01) |
| H04N 19/176 | (2014.01) |

(52) U.S. Cl.
CPC .............. *G06T 7/2066* (2013.01); *G06K 9/46* (2013.01); *G06K 9/4604* (2013.01); *G06K 9/4661* (2013.01); *G06K 9/52* (2013.01); *H04N 19/124* (2014.11); *H04N 19/14* (2014.11); *H04N 19/182* (2014.11); *G06K 2009/4666* (2013.01); *G06T 2207/10016* (2013.01); *G06T 2207/20021* (2013.01); *H04N 19/105* (2014.11); *H04N 19/176* (2014.11)

(58) Field of Classification Search
CPC ......... G06T 7/2066; G06T 2207/10016; G06T 2207/20021; H04N 19/182; H04N 19/14; H04N 19/124; H04N 19/176; H04N 19/105; G06K 9/46; G06K 9/52; G06K 9/4661; G06K 9/4604; G06K 2009/4666
USPC ....................................................... 382/197
See application file for complete search history.

(56) References Cited

U.S. PATENT DOCUMENTS

2008/0049838 A1* 2/2008 Nakaya .................. H04N 19/61
375/240.17

FOREIGN PATENT DOCUMENTS

JP           2010016447 A      1/2010

\* cited by examiner

*Primary Examiner* — Amandeep Saini
(74) *Attorney, Agent, or Firm* — Holtz, Holtz & Volek PC

(57) ABSTRACT

An image processing apparatus which reduces an operation amount while maintaining accuracy in detecting a motion vector, includes a contrast value calculating circuit calculating a contrast value for each processing region including a pixel of interest at a center in a standard image which is one of input images, a bit length determining circuit determining a bit length for calculating a motion vector for the pixel of interest among the images to be smaller than a bit length when the contrast value is calculated, a quantization circuit converting a bit length of the processing region and a region corresponding to at least the processing region among the images to be the bit length determined by the bit length determining circuit, and a motion vector calculating circuit calculating a motion vector for the pixel of interest among the images in the processing region for which the bit length is converted.

6 Claims, 10 Drawing Sheets

FIG. 3

| THE NUMBER OF BITS | NUMERICAL RANGE | CONTRAST VALUE |
|---|---|---|
| 1 | 0-1 | 0 |
| 2 | 0-3 | 0.01 |
| 3 | 0-7 | 0.02 |
| 4 | 0-15 | 0.05 |
| 5 | 0-31 | 0.12 |
| 6 | 0-63 | 0.24 |
| 7 | 0-127 | 0.48 |
| 8 | 0-255 | 1 |

FIG. 10A
FIG. 10B
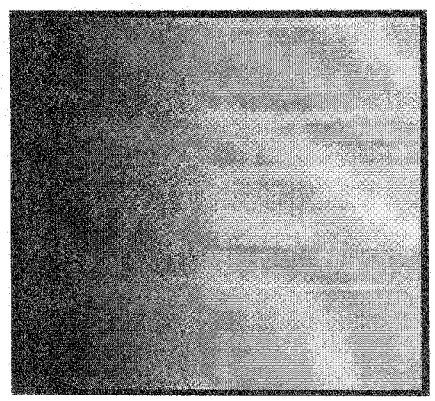
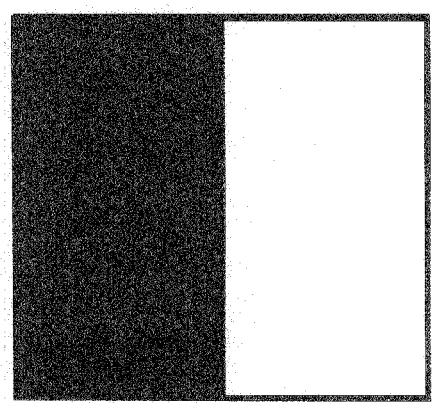
FIG. 11A
FIG. 11B
| -1 | 0 | 1 |
|----|---|---|
| -2 | 0 | 2 |
| -1 | 0 | 1 |
| -1 | -2 | -1 |
|----|----|----|
| 0  | 0  | 0  |
| 1  | 2  | 1  |

IMAGE PROCESSING APPARATUS, METHOD AND MEDIUM STORING A PROGRAM FOR DETECTING A MOTION VECTOR

CROSS-REFERENCE TO RELATED APPLICATIONS

This application is based on Japanese Patent Application No. 2014-155055, the contents of which are incorporated herein by reference.

TECHNICAL FIELD

The present invention relates to an image processing apparatus, an image processing method, and a medium storing an image processing program, and, particularly, to an image processing apparatus detecting a motion vector among a plurality of images.

BACKGROUND ART

Conventionally, an image processing apparatus which calculates a motion vector among a plurality of images using various methods such as a pattern matching method and a gradient method has been proposed.

As such an image processing apparatus calculating a motion vector, for example, PTL 1 discloses an image processing apparatus which reduces a circuit scale or processing time while suppressing false detection of a motion vector. Specifically, PTL 1 discloses obtaining an edge component of each pixel of an input image, dividing the input image into a plurality of thinning unit blocks, comparing magnitude of the edge components, leaving pixels with large edge components and thinning the other pixels for each thinning unit block, and generating a motion vector candidate based on offset positions of the remaining pixels within the thinning unit block.

CITATION LIST

Patent Literature

{PTL 1}
Japanese Unexamined Patent Application, Publication No. 2010-16447

SUMMARY OF INVENTION

Technical Problem

However, the above-described image processing apparatus disclosed in PTL 1 cannot reduce a circuit scale or processing time when there are a larger number of motion vectors than expected, for example, when the number of motion vectors increases as an image includes higher pixels. Because the number of motion vectors tends to increase in response to a request for an image with a larger number of pixels in recent years, how to reduce an operation amount for one motion vector becomes an issue.

The present invention has been made in view of the above-described circumstances, and an object of the present invention is to reduce an operation amount while maintaining detection accuracy when detecting a motion vector.

Solution to Problem

To achieve the above-described object, the present invention provides the following solutions.

One aspect of the present invention is an image processing apparatus including a contrast value calculating circuit that calculates a contrast value for each predetermined processing region, the predetermined processing region including a pixel of interest at the center in at least a standard image using any one of a plurality of input images as the standard image, a bit length determining circuit that determines a bit length for calculating a motion vector for the pixel of interest among the plurality of images to be smaller than a bit length at a time when the contrast value is calculated based on the contrast value, a quantization circuit that converts a bit length of the processing region and a region corresponding to at least the processing region among the plurality of images to be the bit length determined by the bit length determining circuit, and a motion vector calculating circuit that calculates a motion vector for the pixel of interest among the plurality of images for the processing region for which the bit length is converted by the quantization circuit.

BRIEF DESCRIPTION OF DRAWINGS

FIG. 3 illustrates an example of a table where contrast values are associated with bit lengths in the image processing apparatus according to the first embodiment of the present invention.

FIG. 10A is a reference diagram illustrating an example of a region where there is gradation.

FIG. 10B is a reference diagram illustrating an example of a region where brightness changes precipitously.

FIG. 11A illustrates an example of a sobel filter for detecting an edge.

FIG. 11B illustrates another example of a sobel filter for detecting an edge.

DESCRIPTION OF EMBODIMENTS

First Embodiment

An image processing apparatus 1 according to the first embodiment of the present invention will be described below with reference to the drawings.

Figure 1:
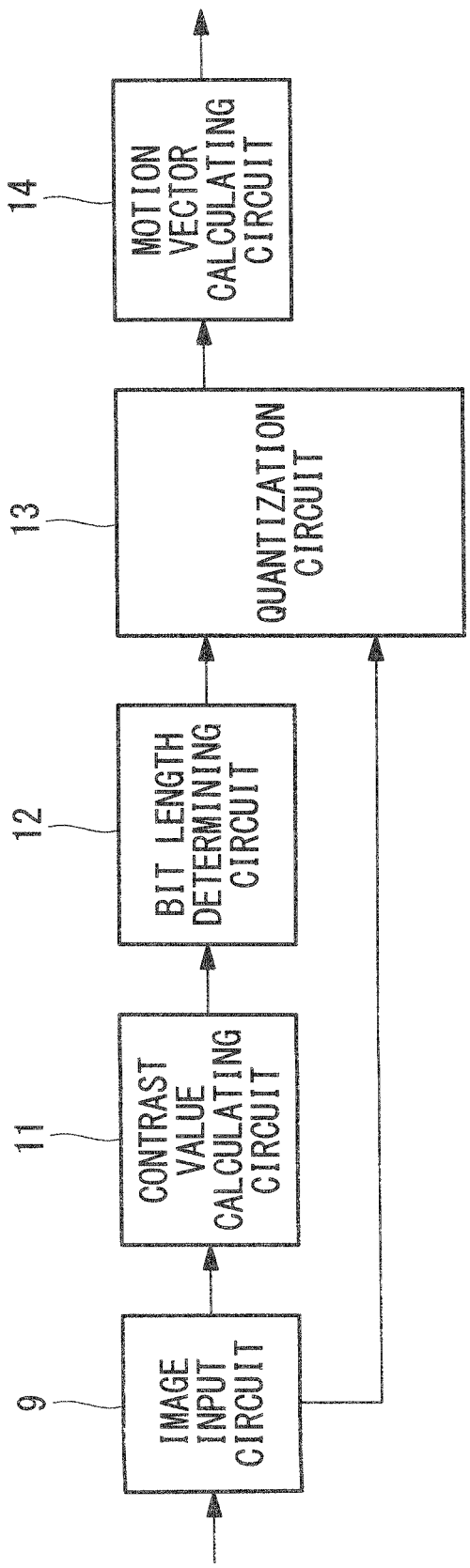
FIG. 1 is a block diagram schematically illustrating a configuration of an image processing apparatus according to a first embodiment of the present invention.

As illustrated in FIG. 1, the image processing apparatus 1 includes an image input circuit 9 to which a plurality of images are input, a contrast value calculating circuit 11 which calculates a contrast value of an image input to the image input circuit, a bit length determining circuit 12 which determines a bit length for calculating a motion vector for a pixel of interest among the plurality of images, a quantization circuit 13 which converts the input image into image data having the bit length determined by the bit length determining circuit, and a motion vector calculating circuit 14 which calculates a motion vector based on the image data.

The image input circuit 9 temporarily stores the plurality of input images, and outputs a necessary image to the contrast value calculating circuit 11 and the quantization circuit 13. It should be noted that, for the convenience of explanation, it is assumed in the present embodiment that two images are input to the image input circuit.

The contrast value calculating circuit 11 uses any one of the two images input by the image input circuit 9 as a standard image and calculates a contrast value for each predetermined processing region, the predetermined processing region including a pixel of interest at the center in at least the standard image. Here, the contrast value of the processing region indicates a gray-scale level of the pixel of interest in the processing region where the pixel of interest is located. It should be noted that in the present embodiment, a motion vector is calculated using a reference image which is an image different from the standard image out of the two images.

Figure 2A:
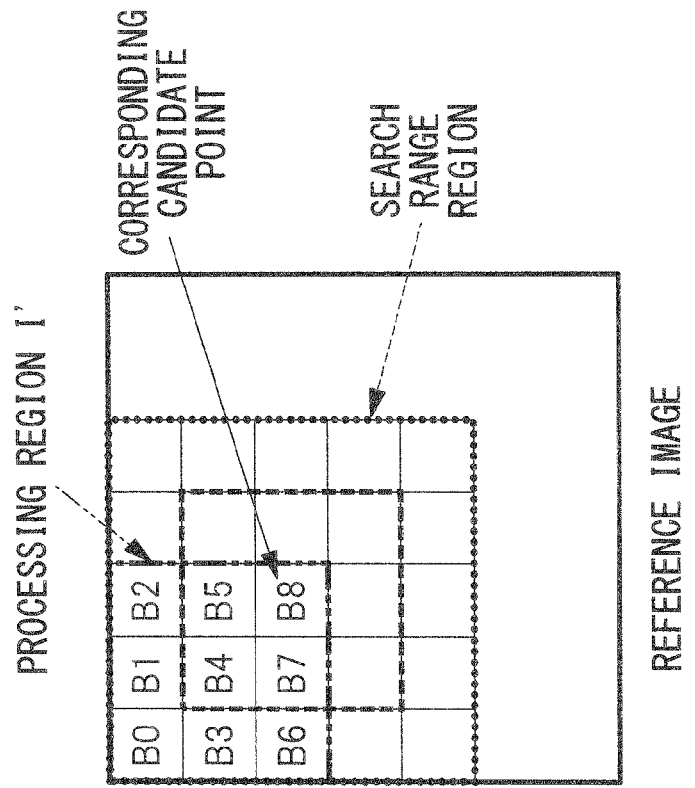
FIG. 2A is an explanatory diagram illustrating a pixel interest and a processing region in a standard image.

Specifically, as illustrated in FIG. 2A, in the standard image acquired from the image input circuit 9, for example, a rectangular region of 3 pixels×3 pixels including a pixel of interest A4 at the center is set as a processing region (kernel region) I which is a target for calculating a contrast value, and a contrast value for the processing region I is calculated according to the following equation (1).

[Expression 1]

$$\text{Contrast} = \frac{\text{max}1 - \text{min}1}{\text{max}1 + \text{min}1} \quad (1)$$

where max 1 is a maximum value of a pixel value in the processing region of the standard image, and min 1 is a minimum value of a pixel value in the processing region of the standard image.

It should be noted that while only a standard image is used to calculate a contrast value of the processing region here, the contrast value may be calculated as follows.

Figure 2B:
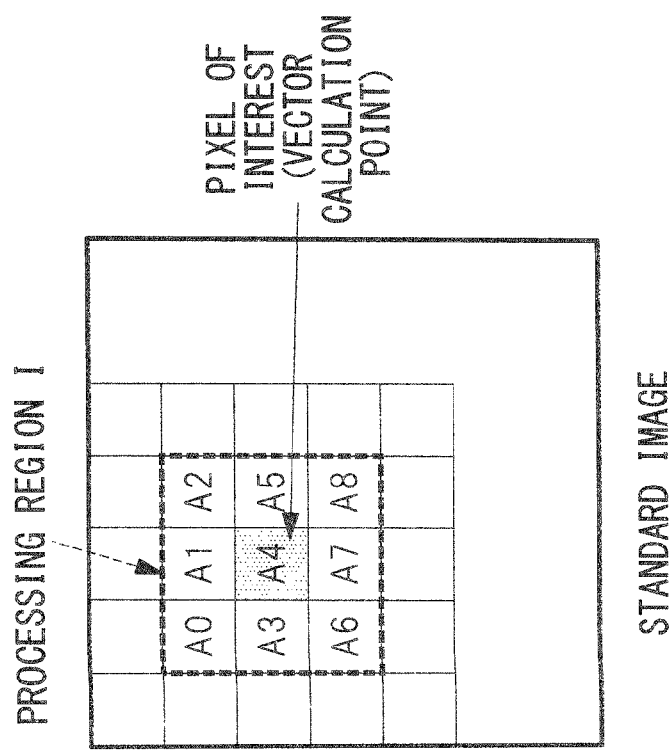
FIG. 2B is an explanatory diagram illustrating a processing region and a search range region in a reference image.

For example, the contrast value can be calculated using a standard image and a reference image which is to be used to calculate a motion vector between the standard image and the reference image. In this case, the contrast value is calculated according to $\text{Contrast}_{both}$ equation (2) and equation (3). At this time, as illustrated in FIG. 2B, the processing region in the reference image is a search range region S for searching a region that matches the processing region I of the standard image.

[Expression 2]

$$\text{Contrast}_{both} = \frac{\text{max} - \text{min}}{\text{max} + \text{min}} \quad (2)$$

[Expression 3]

$$\text{max} = \begin{cases} \text{max}1(\text{max}1 > \text{max}2) \\ \text{max}2(\text{max}2 > \text{max}1) \end{cases} \quad (3)$$

$$\text{min} = \begin{cases} \text{min}1(\text{min}1 < \text{min}2) \\ \text{min}2(\text{min}2 < \text{min}1) \end{cases}$$

In the equations, max 2 is a maximum value of a pixel value in the search range region of the reference image, and min 2 is a minimum value of a pixel value in the search range region of the reference image. By calculating a contrast value using image information of the reference image as well as the standard image, it is possible to convert the bit length with higher accuracy at the quantization circuit 13.

The bit length determining circuit 12 determines a bit length for calculating a motion vector for a pixel of interest relating to the processing region for which the contrast value is calculated among a plurality of images. The bit length is determined to be smaller than the bit length of the processing region at the time when the contrast value is calculated, based on the contrast value calculated by the contrast value calculating circuit 11. At this time, a smaller bit length is determined for a smaller contrast value.

The bit length determining circuit 12 in the present embodiment stores a table (see FIG. 3) where contrast values are associated with bit lengths upon determination of the bit lengths, in a register which is not illustrated, and determines the bit length based on the contrast value with reference to the table. In the table illustrated in FIG. 3, the bit length is made shorter for a smaller contrast value.

When the contrast value is small, a width of a dynamic range of a histogram is also small. If the width of the dynamic range is small, even if the bit length is short, it is enough for operation. Therefore, it is effective to determine the bit length according to the magnitude of the contrast value. It is also possible to determine the bit length using the width of the dynamic range in place of the contrast value.

The quantization circuit 13 converts the processing region in the standard image and a region corresponding to at least the processing region in the reference image into image data having the bit length determined by the bit length determining circuit 12.

In the present embodiment, the processing region in the standard image and the search range region in the reference image are converted into image data having the bit length determined by the bit length determining circuit 12 according to the above-described equation (3). Hereinafter, the processing region in the standard image and the search range region in the reference image will be referred to as a bit length conversion processing target region.

[Expression 4]

$$value2 = \frac{max2 - min2}{max1 - min1} \times (value1 - min1) + min2 \quad (4)$$

Figure 4A:
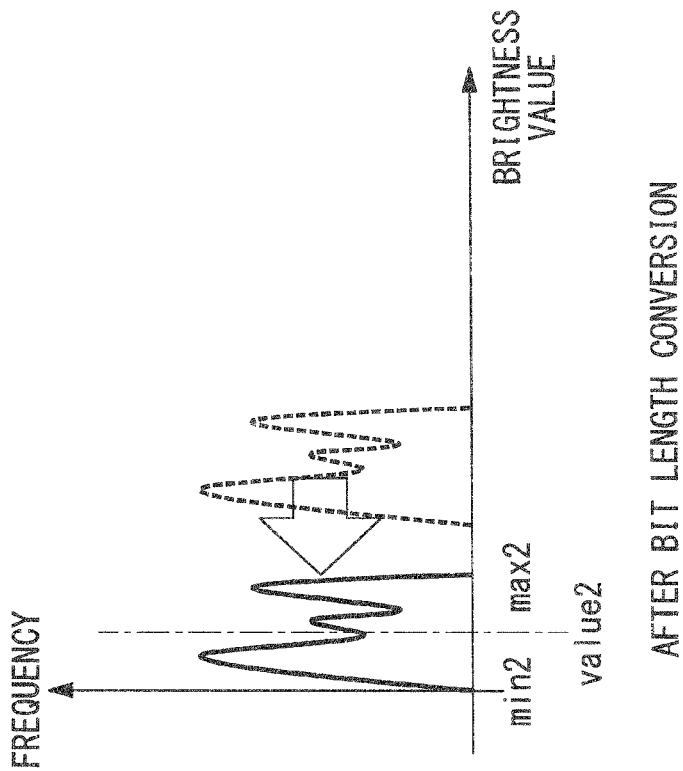
FIG. 4A is a histogram of a brightness value in a processing region prior to bit length conversion in the image processing apparatus according to the first embodiment of the present invention.

As illustrated in FIG. 4 and equation (4), value 1 is a pixel value (8 bits) of the pixel of interest prior to bit length conversion, and min 1 and max 1 are respectively a minimum value and a maximum value of a pixel value in the bit length conversion processing target region prior to bit length conversion. value 2 is a pixel value (n bit) of the pixel of interest after bit length conversion, and min 2 and max 2 are respectively a minimum value and a maximum value of the pixel value in the bit length conversion processing target region after the bit length conversion.

Figure 5B:
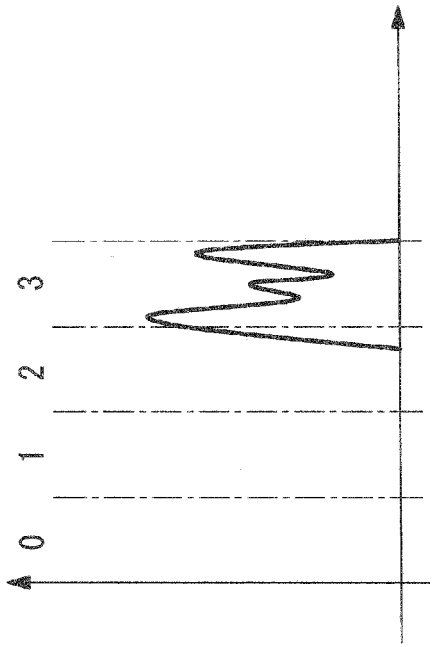
FIG. 5B is a graph indicating change in the histogram when quantization is performed.
Figure 5C:
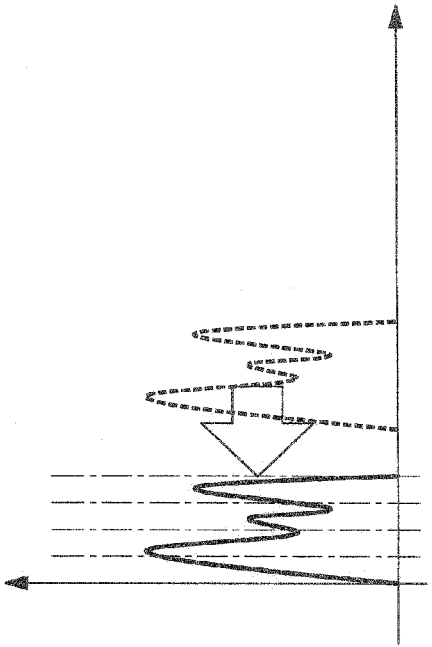
FIG. 5C is a graph indicating change in the histogram when quantization is performed.
Figure 5A:
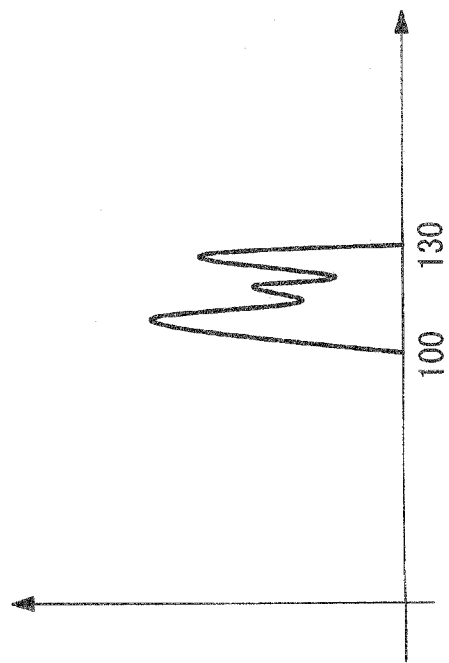
FIG. 5A is a graph indicating change in the histogram when quantization is performed.

Here, an example of quantization will be described using a histogram illustrated in FIG. 5 and equation (4). FIG. 5A is a histogram (which has a small width of a dynamic range and is shifted to the right side) of a somewhat bright image with a small contrast value. In FIG. 5A, a method for calculating equation (4) in the case where the bit length is determined to be 2 bits is as follows.

That is, when the bit length is 2 bits, min 2=0, max 2=3, min 1=100, max 1=130 and value 1=120 are substituted into equation (4). After bit length conversion, as a result of quantization, $2^2=4$, and a value between 0 and 3 is calculated as value 2 in equation (4).

Figure 4B:
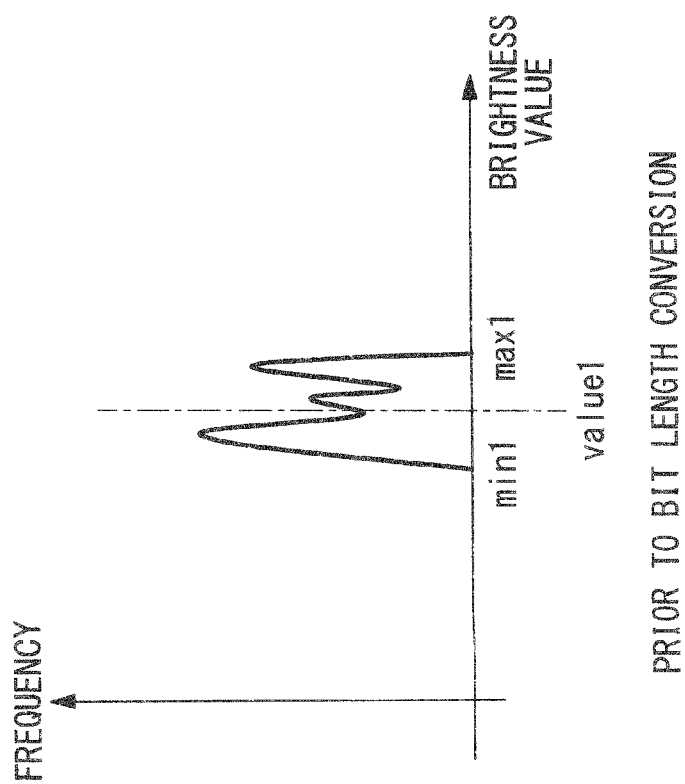
FIG. 4B is a histogram of a brightness value in the processing region after the bit length conversion in the image processing apparatus according to the first embodiment of the present invention.

When the histogram of FIG. 5A is simply quantized using 4 bits, as illustrated in FIG. 4B, quantization fails. Therefore, the bit length conversion processing target region does not include regions with pixel values of 0 and 1, and most of the regions include a pixel value of 3.

However, by using equation (4), it is possible to perform quantization while maintaining original information. As illustrated in FIG. 5C, first, the histogram is shifted to the left side, and quantization is performed using 4 bits. By this means, the bit length conversion processing target region can include regions with all the values between 0 and 3.

Figure 6B:
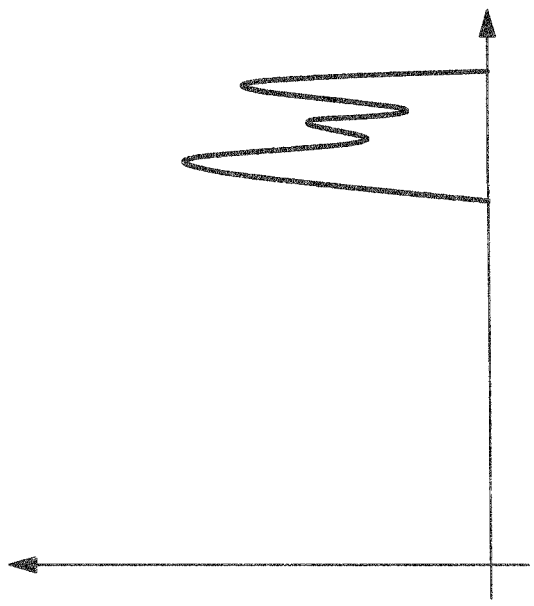
FIG. 6B is a graph indicating relationship between bit length reduction and the histogram.
Figure 6A:
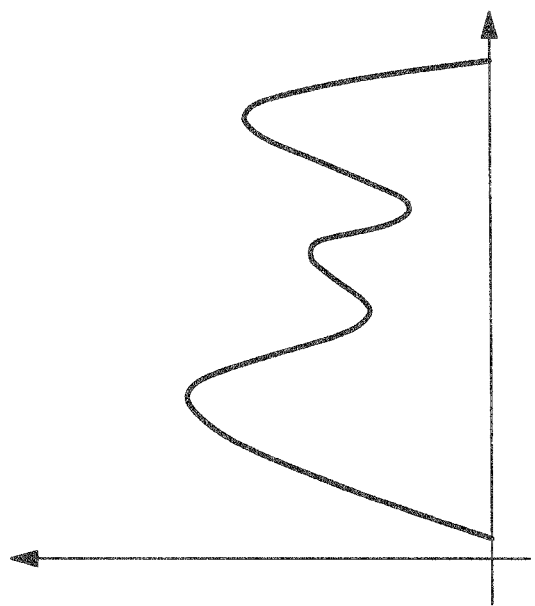
FIG. 6A is a graph indicating relationship between bit length reduction and the histogram.

Here, FIG. 6 illustrates relationship between reduction in the bit length and the histogram. In the present method, in the case of the histogram illustrated in FIG. 6A, it is possible to reduce a bit length while maintaining original information. Meanwhile, in the case of the histogram illustrated in FIG. 6B, while it is possible to reduce a bit length, the original information is degraded along with reduction in the bit length compared to the case of FIG. 6A.

The motion vector calculating circuit 14 calculates a motion vector for the pixel of interest from the processing region of the standard image and the search range region of the reference image for which the bit length is converted by the quantization circuit 13.

An example using block matching will be described below as an example of a method for calculating a motion vector.

Examples of a method for searching highly correlated blocks using block matching include a method using square error SSD and a method using absolute error SAD. That is, these methods obtain a position of I which is highly correlated with I, where I is the processing region in the standard image and I' is a rectangular region of 3 pixels×3 pixels corresponding to the processing region in the reference image (see FIG. 2), and SSD and SAD are defined using the following equation (5) and equation (6). If the values of SSD and SAD are smaller, it is evaluated that the processing region has higher correlation with the rectangular region.

[Expression 5]

$$SSD(I, I') = \sum_{p \in I, q \in I'} (A_p - B_q)^2 \quad (5)$$

$$SAD(I, I') = \sum_{p \in I, q \in I'} \|A_p - B_q\| \quad (6)$$

In the above-described equation (5) and equation (6), pixel positions in the respective block regions are set at

[Expression 6]

$p \in I$ and

[Expression 7]

$q \in I'$ and signal values of the respective pixels are set at $A_p$, $B_q$. Note that p and q respectively have two-dimensional values, I and I' have two-dimensional regions, and

[Expression 8]

$p \in I$ indicates that coordinate p is included in the region I.

Further,

[Expression 9]

"$\|m\|$"

represents processing for acquiring an absolute value of a real value m.

A specific example of calculating a motion vector of pixel A8 in the standard image of FIG. 2 will be described. As described above, it is assumed that the processing region is a rectangular region of 3 pixels×3 pixels, and the search range region is a rectangular region of 5 pixels×5 pixels.

An SAD value or an SSD value in each candidate point within the reference image of FIG. 2 is obtained using equation (5) and equation (6), and a candidate point having the smallest value is set as an end point of the vector of A8. For example, when the candidate point B4 is the end point of the vector of A8, a motion vector in A8 is (−1, −1).

In the present embodiment, the operation amount is reduced by shortening the bit length for calculating Ap−Bp in equation (5) and equation (6) according to the contrast value.

Figure 8:
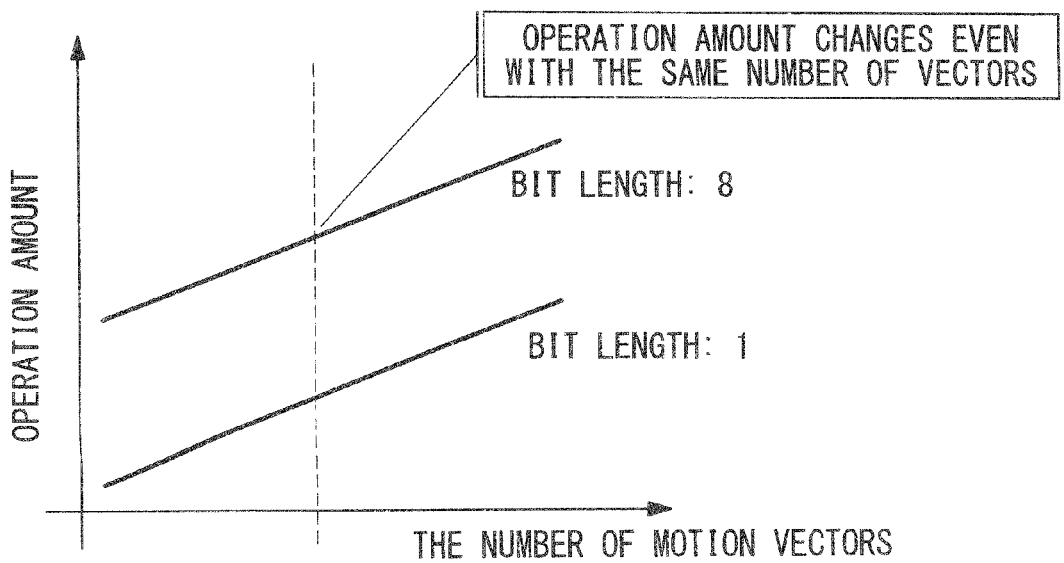
FIG. 8 is a graph indicating relationship between the number of motion vectors and an operation amount.

The relationship between the number of motion vectors and the operation amount is illustrated in FIG. 8. Even if operation is performed using known block matching, by reducing the amount of image data to be processed by reducing the bit length, the operation amount for one motion vector is reduced, so that it is possible to suppress the operation amount even if the number of motion vectors increases.

Figure 7:
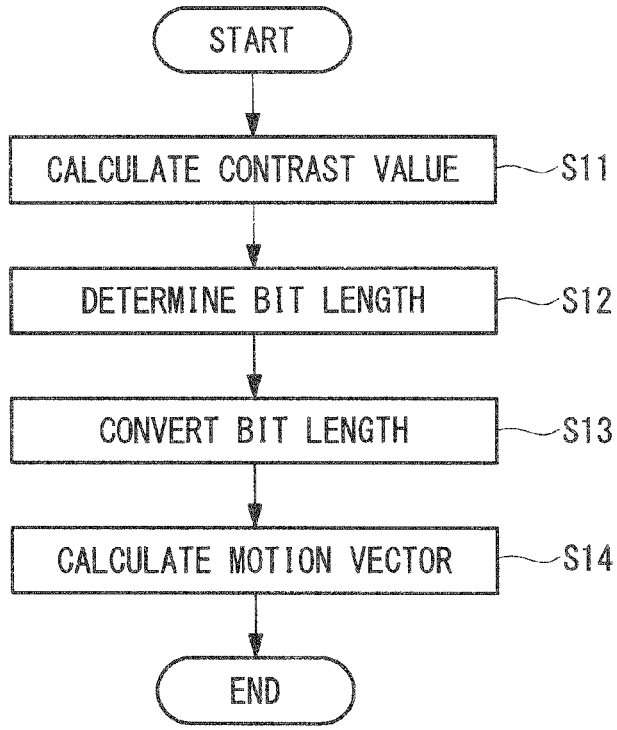
FIG. 7 is a flowchart when a motion vector for the pixel of interest is detected in the image processing apparatus according to the first embodiment of the present invention.

Subsequently, operation of the image processing apparatus configured as described above will be described according to the flowchart of FIG. 7. In the following description, for the convenience of explanation, it is assumed that two images are input as input images, and a motion vector is detected using one image as the standard image while using the other image as the reference image.

In order to detect a motion vector of the input image using the image processing apparatus according to the present embodiment, in step S11, the contrast value calculating circuit 11 acquires two input images from the image input circuit 9 and defines one of these two images as a standard image. Further, the contrast value calculating circuit 11 specifies a pixel of interest to be processed in the standard image, sets a rectangular region of 3 pixels×3 pixels including the pixel of interest at the center as a processing region which is a target for calculating a contrast value and calculates a contrast value for the processing region. The calculated contrast value is output to the bit length determining circuit 12.

Subsequently, in step S12, the bit length determining circuit 12 determines a bit length for calculating a motion vector between the standard image and the reference image for the pixel of interest relating to the processing region for which the contrast value is calculated. It should be noted that the bit length determining circuit 12 determines the bit length according to the table of FIG. 3 and outputs the determined bit length to the quantization circuit 13. In the subsequent step S13, the quantization circuit 13 acquires the standard image and original image data of the reference image from the image input circuit 9 and converts the processing region in the standard image and the search range region in the reference region into image data having the bit length determined by the bit length determining circuit 12. The converted image data is output to the motion vector calculating circuit 14.

In step S14, the motion vector calculating circuit 14 calculates a motion vector for the pixel of interest relating to the processing region from the processing region of the standard image and the search range region of the reference image for which the bit length is converted.

As described above, according to the present embodiment, a standard image is defined from a plurality of input images, and when a motion vector for a pixel of interest in the standard image is calculated, a contrast value of a processing region including the pixel of interest is calculated, and the bit length is made smaller based on the contrast value. Then, the bit length of the processing region and a region corresponding to at least the processing region among the plurality of images is converted to reduce the information amount as image data. By this means, it is possible to reduce the operation amount while maintaining accuracy of detection of a motion vector.

Modified Example

In the above-described first embodiment, the bit length is determined mainly based on the contrast value. In this modified example, the bit length determined based on the contrast value is corrected based on other information.

Figure 9:
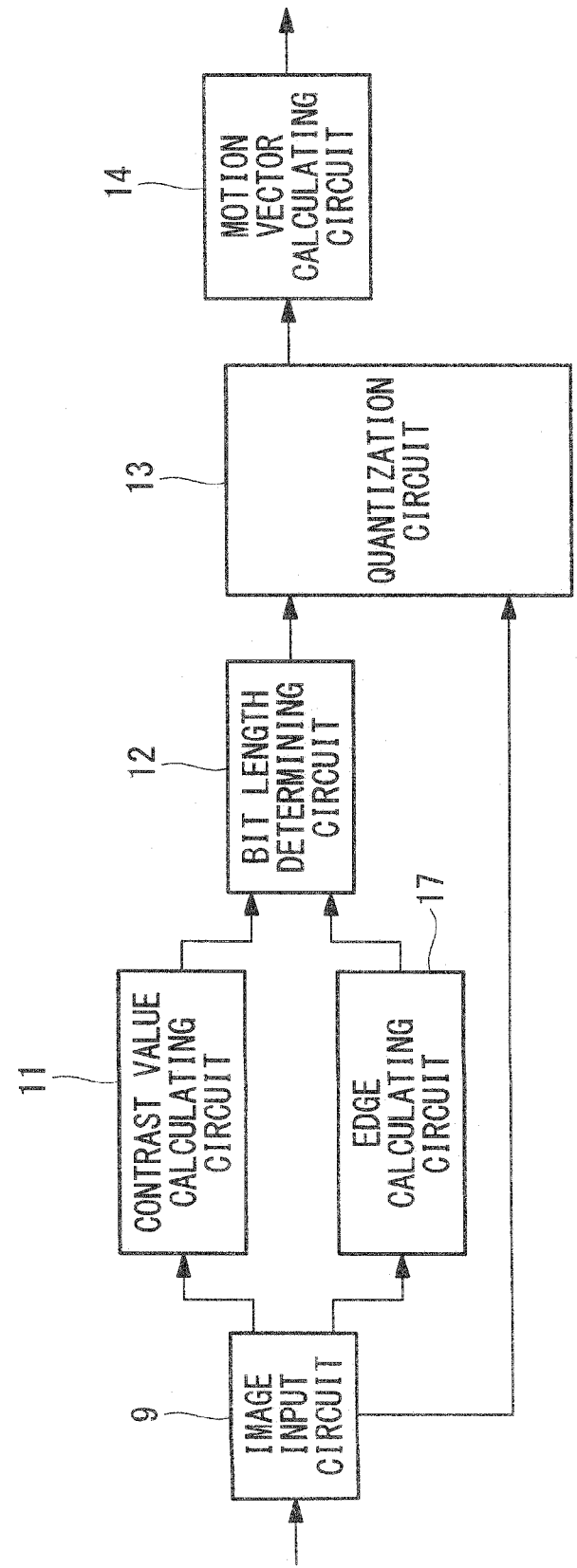
FIG. 9 is a block diagram schematically illustrating a configuration of an image processing apparatus according to a modified example of the first embodiment of the present invention.

That is, as illustrated in FIG. 9, in order to correct the bit length, an edge calculating circuit 17 for calculating a level of gradient of an edge with respect to the pixel of interest is provided, and the bit length determining circuit 12 corrects the bit length corresponding to the contrast value based on the level of the gradient of the edge so that the bit length becomes shorter when the gradient of the edge is great, and the bit length is maintained when the gradient of the edge is small.

When only the contrast value is used, it is impossible to distinguish between an image where there is gradation over a wide area as illustrated in FIG. 10A and an image where brightness changes precipitously as illustrated in FIG. 10B, so that there is a possibility that the operation amount cannot be suppressed for a case of FIG. 10B.

Therefore, in this modified example, by using the level of the gradient of the edge, it is possible to reduce the bit length of a region where the gradient of the edge is great even if the contrast value is high, so that it is possible to further reduce the operation amount.

Specifically, as illustrated in FIG. 9, the edge calculating circuit 17 acquires images which become the standard image and the reference image from the image input circuit 9 and calculates an index value indicating the level of the gradient of the edge (see equation (7)) by, for example, applying a sobel filter for detecting an edge illustrated in FIG. 11.

[Expression 10]

$$\text{Edge}_{val} = \sqrt{(\text{Edge}_x)^2 + (\text{Edge}_y)^2} \qquad (7)$$

In the above-described equation (7), $\text{Edge}_x$ is a value calculated using the filter of FIG. 11A, and $\text{Edge}_y$ is a value calculated using the filter of FIG. 11B.

It should be noted that while the sobel filter of 3 pixels×3 pixels is applied in this modified example, any filter can be used if the filter can detect an edge.

The bit length determining circuit 12 determines a bit length based on the contrast value according to the table of FIG. 3 and corrects the bit length based on the contrast value, based on the index value calculated according to equation (7), that is, based on the level of the gradient of the edge.

Figure 12:
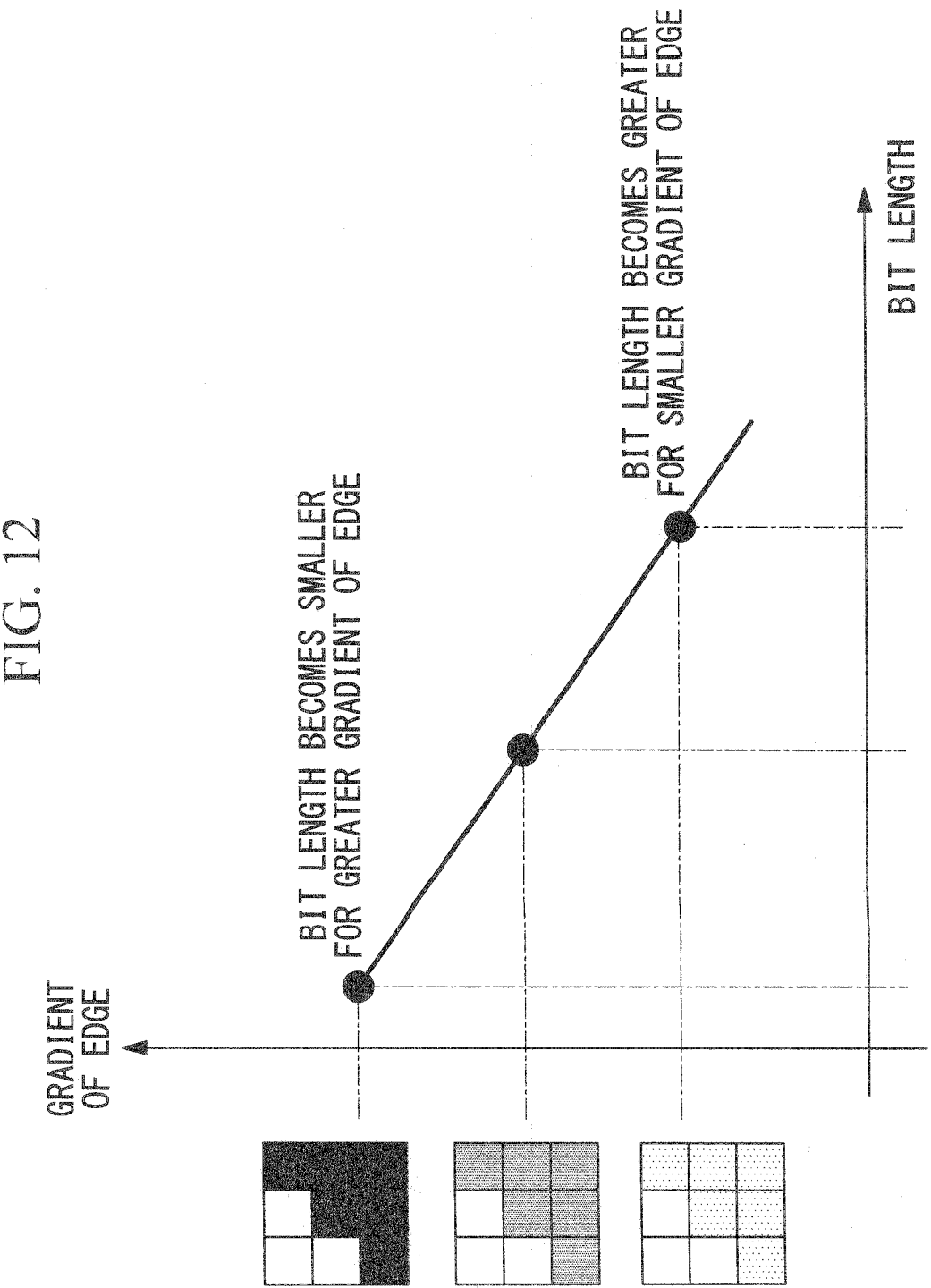
FIG. 12 is a graph indicating relationship between gradient of an edge and a bit length.

The bit length is corrected as follows. That is, the bit length is determined according to the relationship between the gradient of the edge and the bit length illustrated in FIG. 12, so that when the gradient of the edge is great, the bit length is made further smaller, while when the gradient of the edge is small, the bit length is maintained. In other words, the bit length determined based on the contrast value is used as a final bit length when the gradient of the edge is small, while the bit length is made further smaller only when the gradient of the edge is great.

According to the present embodiment, even if there is, for example, gradation over a wide area or brightness changes precipitously in the image, it is possible to accurately distinguish the image, and, even if the contrast value is high, it is possible to reduce the bit length for the region with great gradient of the edge, so that it is possible to further reduce unnecessary operation.

It should be noted that, a general-purpose or dedicated computer can be applied as the above-described image processing apparatus. That is, by deploying a program for executing the above-described image processing in the computer in advance, or by making the computer read the above-described image processing program from a storage medium and deploying the program, the general-purpose or dedicated computer can be made to function as the image processing apparatus.

Further, the present invention can be also realized by configuring various circuits of the above-described image processing apparatus to be implemented as one chip or configuring various circuits so that the circuits are divided and implemented on a wiring substrate.

According to the present aspect, the standard image is determined from the plurality of input images, and, when a motion vector for the pixel of interest in the standard image is calculated, a contrast value in the processing region including the pixel of interest is calculated, and the bit length is determined based on the contrast value. Because a pixel or a region with a high contrast value includes a large amount of information as an image, if the bit length of the pixel and the region is made small, necessary information is likely to disappear. Meanwhile, if a bit length for a pixel or a region which has a low contrast value and which does not include a large amount of information as an image, is maintained long, an operation amount becomes too much when a motion vector is calculated. Therefore, the bit length determining circuit determines the bit length to be small based on the contrast value, and the quantization circuit converts the bit length of the processing region and the region corresponding to at least the processing region among the plurality of images to be the determined bit length. The quantization circuit converts the bit length of the processing region and the region corresponding to at least the processing region among the plurality of images to be the bit length determined by the bit length determining circuit. By this means, it is possible to reduce an operation amount while maintaining accuracy of detection of a motion vector.

In the above-described aspect, the bit length determining circuit preferably determines a smaller bit length for the smaller contrast value.

By this means, it is possible to reduce an unnecessary operation amount according to the contrast value and maintain accuracy of detection of a motion vector.

In the above-described aspect, it is preferable that an edge calculating circuit which calculates a level of gradient of an edge with respect to the pixel of interest is provided, and the bit length determining circuit further corrects the bit length determined based on the contrast value, based on the level of the gradient of the edge.

By this means, even if there is, for example, gradation over a wide range or brightness changes precipitously in the image, it is possible to distinguish the image accurately and reduce unnecessary operation.

In the above-described aspect, the bit length determining circuit preferably corrects the determined bit length to be smaller for greater gradient of the edge.

By this means, even if the contrast value is high, because it is possible to make the bit length small for a region where the level of the gradient of the edge is great, it is possible to further reduce unnecessary operation.

Advantageous Effects of Invention

According to the present invention, it is possible to provide an advantage of enabling reduction of an operation amount while maintaining detection accuracy when detecting a motion vector.

REFERENCE SIGNS LIST

9 Image input circuit
11 Contrast value calculating circuit
12 Bit length determining circuit
13 Quantization circuit
14 Motion vector calculating circuit
17 Edge calculating circuit

The invention claimed is:

1. An image processing apparatus comprising:
a contrast value calculating circuit that calculates a contrast value for each predetermined processing region, the predetermined processing region including a pixel of interest at a center in a standard image using any one of a plurality of input images as the standard image;
a bit length determining circuit that determines a bit length for calculating a motion vector for the pixel of interest among the plurality of images to be smaller than a bit length at a time when the contrast value is calculated based on the contrast value;
a quantization circuit that converts a bit length of the processing region and a region corresponding to at least the processing region among the plurality of images to be the bit length determined by the bit length determining circuit; and
a motion vector calculating circuit that calculates a motion vector for the pixel of interest among the plurality of images for the processing region for which the bit length is converted by the quantization circuit.

2. The image processing apparatus according to claim 1, wherein the bit length determining circuit determines the bit length such that the bit length becomes smaller as the contrast value becomes smaller.

3. The image processing apparatus according to claim 1, further comprising an edge calculating circuit that calculates a level of gradient of an edge with respect to the pixel of interest,
wherein the bit length determining circuit further corrects the bit length determined based on the contrast value, based on the level of the gradient of the edge.

4. The image processing apparatus according to claim 3, wherein the bit length determining circuit corrects the determined bit length to be further smaller for greater gradient of the edge.

5. An image processing method comprising:
a contrast value calculating step of calculating a contrast value for each predetermined processing region, the predetermined processing region including a pixel of interest at a center in a standard image using any one of a plurality of input images as the standard image;
a bit length determining step of determining a bit length for calculating a motion vector for the pixel of interest among the plurality of images to be smaller than a bit length at a time when the contrast value is calculated based on the contrast value;
a quantization step of converting a bit length of the processing region and a region corresponding to at least the processing region among the plurality of images to be the bit length determined in the bit length determining step; and
a motion vector calculating step of calculating a motion vector for the pixel of interest among the plurality of images for the processing region for which the bit length is converted in the quantization step.

6. A non-transitory computer-readable medium storing a computer program for causing a computer to execute image processing comprising:
a contrast value calculating step of calculating a contrast value for each predetermined processing region, the predetermined processing region including a pixel of interest at a center in a standard image using any one of a plurality of input images as the standard image;
a bit length determining step of determining a bit length for calculating a motion vector for the pixel of interest among the plurality of images to be smaller than a bit length at a time when the contrast value is calculated based on the contrast value;
a quantization step of converting a bit length of the processing region and a region corresponding to at least the processing region among the plurality of images to be the bit length determined in the bit length determining step; and
a motion vector calculating step of calculating a motion vector for the pixel of interest among the plurality of images for the processing region for which the bit length is converted in the quantization step.

\* \* \* \* \*